US005768085A

United States Patent [19]

Boy et al.

[11] Patent Number: 5,768,085

[45] Date of Patent: Jun. 16, 1998

[54] RESERVE SERIES GAP FOR A GAS-FILLED SURGE DIVERTER AND GAS-FILLED THREE-ELECTRODE SURGE DIVERTER WITH MOUNTED RESERVE SERIES GAPS

[75] Inventors: Juergen Boy; Gerhard Lange, both of Berlin, Germany

[73] Assignee: Siemens Aktiengesellschaft, Munich, Germany

[21] Appl. No.: 756,847

[22] Filed: Nov. 26, 1996

[30] Foreign Application Priority Data

Nov. 30, 1995 [DE] Germany ........................ 195 46 220.3

[51] Int. Cl.$^6$ ........................ H02H 1/04

[52] U.S. Cl. ........................ 361/130; 361/112

[58] Field of Search ........................ 361/111, 112, 361/117–120, 126–130

[56] References Cited

U.S. PATENT DOCUMENTS

| | | | |
|---|---|---|---|
| 4,062,054 | 12/1977 | Simokat | 361/119 |
| 5,282,109 | 1/1994 | Smith | 361/119 |
| 5,388,023 | 2/1995 | Boy et al. | 361/129 |
| 5,450,273 | 9/1995 | Boy | 361/129 |

*Primary Examiner*—Ronald W. Leja

*Attorney, Agent, or Firm*—Kenyon & Kenyon

[57] ABSTRACT

As a reserve series gap for a gas-filled three-electrode diverter, an arrangement is used that consists of two disk-shaped electrodes arranged axially behind one another with the same outer diameter and of an insulating foil arranged between these electrodes, these three parts being held together by means of a shrink tube. When such a reserve series gap is associated with an end electrode of a three-electrode diverter, the reserve series gap can also serve as a movable contact element of an overload path, given an appropriate design of the foot of the end electrode and the outer-lying electrode and upon combination with a fusible pellet.

3 Claims, 1 Drawing Sheet

RESERVE SERIES GAP FOR A GAS-FILLED SURGE DIVERTER AND GAS-FILLED THREE-ELECTRODE SURGE DIVERTER WITH MOUNTED RESERVE SERIES GAPS

FIELD OF THE INVENTION

The present invention is directed to overvoltage protection for communications networks and to the structure of a reserve series gap that is mounted axially on an end electrode of a gas-filled surge diverter, particularly on the two end electrodes of a gas-filled three-electrode surge diverter.

BACKGROUND INFORMATION

In order to protect against overvoltages, which can arise due to lightning strikes, gas-filled surge diverters are used in communications networks and their associated devices. Such surge diverters have two discharge gaps and consist of a middle electrode, two end electrodes, and two hollow-cylindrical ceramic insulators. Each ceramic insulator is hard-soldered to the middle electrode as well as to an end electrode. To ensure that such surge diverters can perform their function even when a leakage occurs in the housing, it is known to associate with each diverter gap a reserve series gap that can be designed as a spark gap in air. Such reserve series gaps are known as "air-gap back ups" and often consist of two disk-shaped electrodes between which a holed insulating foil is arranged. This insulating foil may be made of plastic, mica, or ceramic material. In a known reserve series gap of this type, the two electrodes and the holed insulating foil are bonded together and are surrounded by a flat insulating housing which is used to mount the reserve series gap axially on to the respective end electrode of the three-electrode surge diverter. For electrical contact-making and for mechanical fixing of the two reserve series gaps, moreover, a two-armed shackle is used which is clamped on to the middle electrode of the surge diverter. Further, the two-armed shackle axially abuts with its free ends on to the one electrode of each reserve series gap. Such a two-armed shackle is described in U.S. Pat. No. 5,282,109.

In another known surge diverter of this type, the two reserve series gaps are constructed according to an encapsulated design, in which the two electrodes of each reserve series gap are joined in a vacuum-tight manner using a glass insulator. Here, the level of the igniting voltage is set by the gas filling. This type of surge diverter is described in German Patent Application No. 42 36 538 and U.S. Pat. No. 5,450,273.

Moreover, it is known to additionally design the aforementioned surge diverters so that when the diverter overheats, the two gas discharge paths are short-circuited. This short-circuiting is referred to as "fail-safe behavior". For this purpose, the ends of the shackle fastened to the middle electrode bear a cap that is provided with a flange-type edge. This edge is fixed by means of a spacer at a distance from the respective end electrode of the surge diverter. As a spacer, a fusible pellet and an insulating component are used, in which the insulating component comprises, for example, a metal-oxide varistor which assumes the function of the reserve series gap. Such a surge diverter is described in German Patent Application No. 43 18 366 and U.S. Pat. No. 5,388,023.

An object of the present invention is to develop the reserve series gap such that its manufacture is simplified and such that it is easily associated with the surge diverter.

SUMMARY OF THE INVENTION

The present invention achieves the aforementioned object by providing two disk-shaped electrodes having the same outer diameter and a shrink tube that surrounds the surface area of the two disk-shaped electrodes, thus forming a unit with the two electrodes and the insulating foil.

In such a reserve series gap, the necessary functional parts are mechanically joined together by means of a simple and extremely small and easy-to-assemble construction element, namely, the aforementioned shrink tube.

The reserve series gap formed according to the present invention is particularly suited to the fitting of three-electrode surge diverters in which a two-armed shackle is fastened to the middle electrode. In such diverters, each end of the shackle axially presses a reserve series gap in a flexible manner against an end electrode. The foot of each end electrode is provided with a cylindrical recess for receiving a fusible pellet (due to the desired "fail-safe" behavior) and for receiving in a centric manner the one electrode of the reserve series gap. Moreover, each end of the arms of the shackle bears a cap covering the reserve series gap. This cap has a flange-type edge, the axial distance of which from the respective end electrode being smaller than the height of the fusible pellet to ensure the desired "fail-safe" behavior.

In a second representative embodiment of the present invention, instead of having the two caps on the ends of the arms of the shackle as movable electrodes for the "fail-safe" case, the outer-lying electrodes of the reserve series gaps can also serve as movable electrodes. For this purpose, the outer-lying electrodes are provided with a cylindrical shoulder whose outer diameter is greater than the diameter of the recess in the foot of the respective end electrode. Moreover, the axial depth of the recess is smaller than the axial height of the fusible pellet and the region of the reserve series gap surrounded by the shrink tube.

Thus, according to the present invention, the outer-lying electrode of the reserve series gap is normally insulated by an air gap from the end electrode of the surge diverter; in case of a thermal overloading of the surge diverter, the fusible pellet melts, thus causing the outer-lying electrode of the reserve series gap to be pressed by the arm of the shackle against the end electrode of the surge diverter.

DETAILED DESCRIPTION

Figure 1:
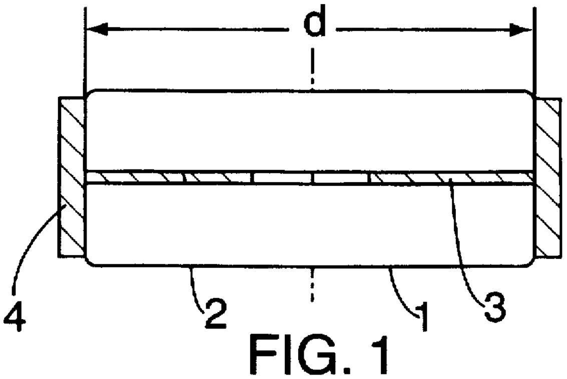
FIG. 1 illustrates a first exemplary embodiment of a reserve series gap.

FIG. 1 shows a reserve series gap comprising two circular-disk-shaped electrodes 1 and 2 between which an insulating foil 3 is arranged. The two electrodes 1 and 2 have the same outer diameter d. The insulating foil 3 has a hole in its center and its outer diameter is smaller than the outer diameter d of the electrodes 1 and 2. A shrink tube 4 holds the two electrodes 1 and 2 and the insulating foil 3 axially together. The axial length of the shrink tube 4 is chosen to be somewhat shorter than the axial height of the reserve series gap in order to guarantee proper contact-making of the two electrodes of the reserve series gap.

In case of more central contact-making of the electrodes, the shrink tube can also be chosen longer so that it wraps around the edges of the electrodes in the shrunken state.

Figure 2:
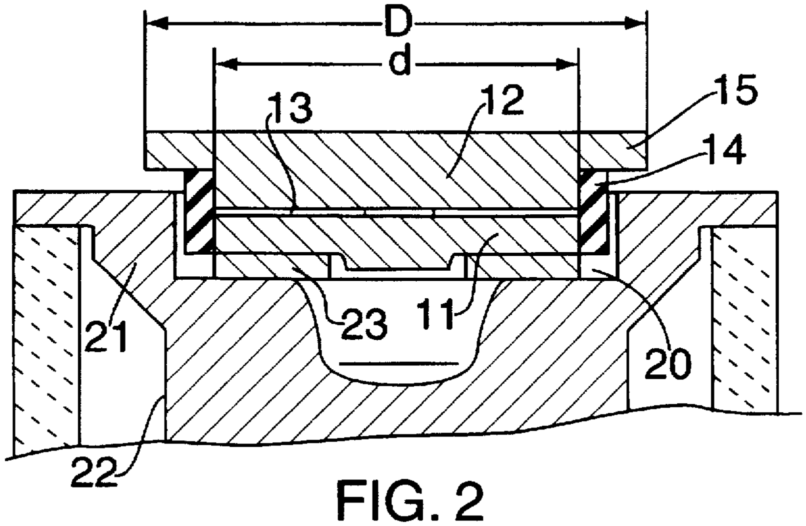
FIG. 2 illustrates a second exemplary embodiment of a reserve series gap arranged on a diverter electrode.

According to FIG. 2, the holed insulating foil 13 and the two electrodes 11 and 12 are used for a reserve series gap, in which the electrode 11 is designed to have a disk-shaped form and the electrode 12 is designed to be in the form of a graded cylinder. The outer diameter of the electrode 11 and the smaller outer diameter d of the electrode 12 are the same, and in this region the shrink tube 14 abuts against the electrodes. The cylindrical shoulder 15 of the electrode 12 with the larger outer diameter D juts radially over the recess 20 in the foot 21 of an end electrode 22 of a surge diverter. The recess 20 is used to receive a fusible pellet 23 and the reserve series gap 11/12/13/14. According to this arrangement, the cylindrical shoulder 15 simultaneously represents an axially movable electrode contact.

Figure 3:
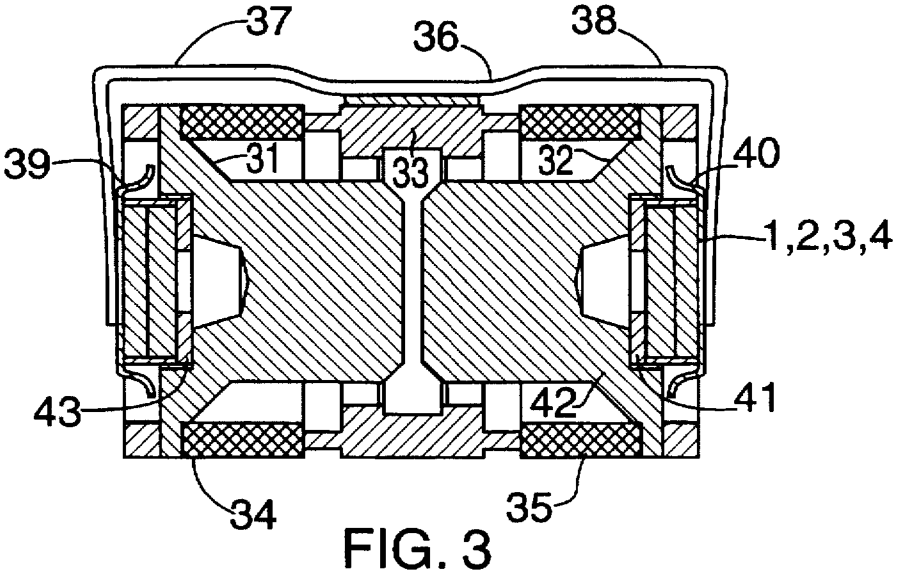
FIG. 3 illustrates a transverse representation of a three-electrode surge diverter with mounted reserve series gaps according to FIG. 1.

FIG. 3 shows a three-electrode surge diverter with end electrodes 31 and 32, a middle electrode 33, the insulators 34 and 35, a shackle 36 with arms 37 and 38 and caps 39 and 40. The flexible arms 37 and 38 press by means of the caps 39 and 40 in each case a reserve series gap according to FIG. 1 and a fusible pellet 41 against an end electrode. The foot 42 of each end electrode is provided for this purpose with a recess 43 for receiving the fusible pellet 41 and for centering the reserve series gap.

What is claimed is:

1. A reserve series gap for axial mounting on an end electrode of a gas-filled surge diverter, comprising:
   - a first disk-shaped electrode;
   - a second disk-shaped electrode arranged axially adjacent to the first disk-shaped electrode, the second disk-shaped electrode having an outer diameter substantially equal to an outer diameter of the first disk-shaped electrode;
   - an insulating foil arranged between the first disk-shaped electrode and the second disk-shaped electrode; and
   - a shrink tube surrounding a circumferential surface area of the first disk-shaped electrode and a circumferential surface area of the second disk-shaped electrode.

2. A gas-filled three-electrode surge diverter, comprising:
   - a middle electrode;
   - a first end electrode having a first foot;
   - a second end electrode having a second foot;
   - a first hollow, cylindrical ceramic insulator coupled to the middle electrode and to the first end electrode;
   - a second hollow, cylindrical ceramic insulator coupled to the middle electrode and to the second end electrode;
   - a first reserve series gap mounted axially on the first end electrode;
   - a second reserve series gap mounted axially on the second end electrode, wherein each one of the first and second reserve series gaps comprises:
     - a first disk-shaped electrode,
     - a second disk-shaped electrode arranged axially adjacent to the first disk-shaped electrode, the second disk-shaped electrode having an outer diameter equal to an outer diameter of the first disk-shaped electrode,
     - an insulating foil arranged between the first disk-shaped electrode and the second disk-shaped electrode, and
     - a shrink tube surrounding a circumferential surface area of the first disk-shaped electrode and a circumferential surface area of the second disk-shaped electrode; and
   - a two-armed shackle fastened to the middle electrode, the two-armed shackle having a plurality of ends, each one of the ends of the shackle axially abutting in a flexible manner one of the first and second disk-shaped electrodes of a corresponding reserve series gap, wherein each one of the foot of the first end electrode and the foot of the second end electrode includes a cylindrical recess for receiving a fusible pellet and one of the first and second disk-shaped electrodes of a corresponding one of the first and second reserve series gaps, and wherein each one of the ends of the shackle bears a cap having a flange-shaped edge, each flange-shaped edge being disposed at an axial distance from a corresponding one of the first and second end electrodes, the axial distance being smaller than a height of the fusible pellet.

3. A gas-filled three-electrode surge diverter, comprising:
   - a middle electrode;
   - a first end electrode having a first foot;
   - a second end electrode having a second foot;
   - a first hollow, cylindrical ceramic insulator coupled to the middle electrode and to the first end electrode;
   - a second hollow, cylindrical ceramic insulator coupled to the middle electrode and to the second end electrode;
   - a first reserve series gap mounted axially on the first end electrode;
   - a second reserve series gap mounted axially on the second end electrode, wherein each one of the first and second reserve series gaps comprises:
     - a first disk-shaped electrode,
     - a second disk-shaped electrode arranged axially adjacent to the first disk-shaped electrode, the second disk-shaped electrode having an outer diameter equal to an outer diameter of the first disk-shaped electrode,
     - and insulating foil arranged between the first disk-shaped electrode and the second disk-shaped electrode, and
     - a shrink tube surrounding a circumferential surface area of the first disk-shaped electrode and a circumferential surface area of the second disk-shaped electrode; and
   - a two-armed shackle fastened to the middle electrode, the two-armed shackle having a plurality of ends, each one of the ends of the shackle axially abutting in a flexible manner any one of the first and second disk-shaped electrodes of a corresponding reserve series gap, wherein each one of the foot of the first end electrode and the foot of the second end electrode includes a cylindrical recess for receiving a fusible pellet and one of the first and second reserve series gaps, wherein at least one of the first disk-shaped electrode and the second disk-shaped electrode of each one of the first reserve series gap and second reserve series gap includes a cylindrical shoulder having an outer diameter that is greater than a diameter of the cylindrical recesses of one of the foot of the first end electrode and the foot of the second end electrode, and wherein an axial height of the fusible pellet and an axial height of any one of the disk-shaped electrodes of the reserve series gaps are greater than an axial depth of any one of the cylindrical recesses of the first end electrode and the second end electrode.

* * * * *